United States Patent
Bose et al.

(10) Patent No.: US 7,447,923 B2
(45) Date of Patent: Nov. 4, 2008

(54) SYSTEMS AND METHODS FOR MUTUALLY EXCLUSIVE ACTIVATION OF MICROPROCESSOR RESOURCES TO CONTROL MAXIMUM POWER

(75) Inventors: Pradip Bose, Yorktown Heights, NY (US); Alper Buyuktosunoglu, White Plains, NY (US); Zhigang Hu, Ossining, NY (US); Hans Mikael Jacobson, White Plains, NY (US); Vijayalakshmi Srinivasan, New York, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 11/207,333

(22) Filed: Aug. 19, 2005

(65) Prior Publication Data

US 2007/0043960 A1    Feb. 22, 2007

(51) Int. Cl.
*G06F 1/00* (2006.01)
*G06F 1/26* (2006.01)
*G06F 1/32* (2006.01)
(52) U.S. Cl. .................. 713/300; 713/320; 713/323; 713/330

(58) Field of Classification Search .................. 713/300
See application file for complete search history.

(56) References Cited

U.S. PATENT DOCUMENTS

| 4,488,006 | A | * | 12/1984 | Essig et al. | 379/395.01 |
|---|---|---|---|---|---|
| 5,189,314 | A | | 2/1993 | Georgiou et al. | 307/271 |
| 5,504,908 | A | | 4/1996 | Ikeda | 395/750 |
| 6,047,248 | A | | 4/2000 | Georgiou et al. | 702/132 |
| 7,099,784 | B2 | * | 8/2006 | Spitaels et al. | 702/57 |
| 2002/0147529 | A1 | * | 10/2002 | Johnson | 700/286 |
| 2003/0204759 | A1 | * | 10/2003 | Singh | 713/320 |
| 2004/0167732 | A1 | * | 8/2004 | Spitaels et al. | 702/62 |
| 2006/0206730 | A1 | * | 9/2006 | Cartes et al. | 713/300 |

* cited by examiner

*Primary Examiner*—Rehana Perveen
*Assistant Examiner*—Michael J Brown
(74) *Attorney, Agent, or Firm*—F. Chau & Associates, LLC

(57) ABSTRACT

A device for controlling power parameters in a microprocessor includes a resource activation control unit for controlling the maximum power of the microprocessor and two or more resources. The resource activation control unit controls the activation of the resources such that the consumed and dissipated power of the microprocessor does not exceed a power bound which is configurable to a predetermined value below the maximum power.

9 Claims, 12 Drawing Sheets

SYSTEMS AND METHODS FOR MUTUALLY EXCLUSIVE ACTIVATION OF MICROPROCESSOR RESOURCES TO CONTROL MAXIMUM POWER

TECHNICAL FIELD

The present invention generally relates to microprocessors and more particularly to methods for controlling power dissipation and consumption in microprocessors.

BACKGROUND

Microprocessors are being built with an increasing number of electronic components packed in a relatively small chip space. Issues of power consumption and dissipation come to fore due as the amount of electronic components in a microprocessor increases. Power dissipation and consumption affect design choices and operating conditions for microprocessors. Hence, there is a need to minimize power dissipation and consumption in microprocessors. In the following, unless specifically qualified, the term "power" is used to subsume both the "dissipation" and "consumption" aspects of power parameters.

There is a distinction between the average power and maximum power dissipation. Average power refers to power averaged over a set of applications or programs, typically run by the customer. Saving the average power reduces the energy cost in wired applications, and prolongs the battery life in portable applications. Maximum power is power dissipated over a segment of code that utilizes the maximum number of resources in the microprocessor. The maximum power sets a requirement on the power dissipating capabilities of the package, and the current delivery capabilities of the power distribution system. Therefore the maximum power has a large impact on the cost of a microprocessor.

There exist several techniques for reducing power in components or resources of a microprocessor. Clock gating is one such technique. Clock gating can only save the dynamic or switching component of power. Another power-saving technique is called data gating. Data gating involves insertion of transition barriers at the inputs of microprocessor components. These transition barriers are typically implemented as either AND or OR logic gates. On cycles when the microprocessor component is not used, the transition barriers prevent the inputs to the component from switching, which results in saving the dynamic or switching power inside the data-gated component. Like clock gating, data gating can only save the dynamic or switching power, but not leakage.

Power gating (also referred to as Vdd-gating) is one another known power saving technique which reduces both the dynamic and leakage power components. Unlike clock gating, Vdd-gating requires multiple clock cycles to activate a Vdd-gated resource which calls for a more sophisticated control mechanism. A Vdd-gated resource must remain gated for a minimum number of cycles (typically tens of cycles) in order to amortize the energy overhead associated with the process of activation and deactivation of the resource, One approach to controlling the gating of microprocessor resources involves Reactive Gating (RG) techniques. These RG techniques are used to control the maximum temperature of the chip and/or the maximum current drawn by the microprocessor core or the chip. RG techniques use a set of temperature or current sensors that generate signals for gating microprocessor resources if the temperature (or current consumption) sensed by one of the sensors exceeds a threshold. The threshold is set below the limit of the power dissipating capabilities of the package or below the current delivery capabilities of the power delivery system.

RG techniques do not allow relaxing the requirements on the power or current delivery systems due to threshold based control, and the threshold must be set at a relatively pessimistic or conservative level for reactive mechanism to trigger in time and prevent chip failure. RG techniques make it difficult to predict the performance of the processor core, because the reactive mechanism may trigger during the execution of the program. Further, the triggering mechanism for power saving RG techniques may depend on the operating environment factors such as temperature. This triggering mechanism makes the performance of the microprocessor depend on the operating environment factors.

Some examples of the RG techniques are discussed next. U.S. Pat. No. 6,047,248 and U.S. Pat. No. 5,189,314 to Georgiou, et al., propose techniques to vary processor performance based on the information received from thermal sensors. These RG techniques use reactive throttling techniques which are activated upon feedback from the on-chip monitoring of a set of performance metrics.

Another approach to controlling gating involves pure predictive gating techniques that reduce the average microprocessor core or chip power but do not guarantee any reduction under the maximum power usage or provide any upper bound on the maximum power when all microprocessor resources are fully utilized. As an example of a pure predictive gating technique, U.S. Pat. No. 5,504,908 to Ikeda discloses use of address access information to determine when the processor is in an idle loop. These techniques for controlling gating do not allow any relaxing of the requirements on the power dissipation capabilities of the package or the current delivery capabilities of the power delivery system which impact the cost of the microprocessor. Hence, there is a need for a technique(s) to control dissipation of power and minimize the maximum power in a microprocessor.

SUMMARY OF THE INVENTION

Exemplary embodiments of the invention generally include systems and methods for controlling power dissipation and consumption in microprocessors. More specifically, in one exemplary embodiment of the invention, a system for controlling power parameters in a microprocessor includes a resource activation control unit for controlling the maximum power of the microprocessor and two or more resources. The resource activation control unit controls the activation of the resources such that the consumed and dissipated power of the microprocessor does not exceed a power bound which is configurable to a predetermined value below the maximum power.

In another exemplary embodiment of the invention, a method for controlling power parameters in a microprocessor includes controlling the activation of two or more resources of the microprocessor; and maintaining the total power consumed and dissipated by the resources that are activated to be below a power bound that is configurable to a predetermined value below a maximum power of the microprocessor.

These and other embodiments, aspects, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
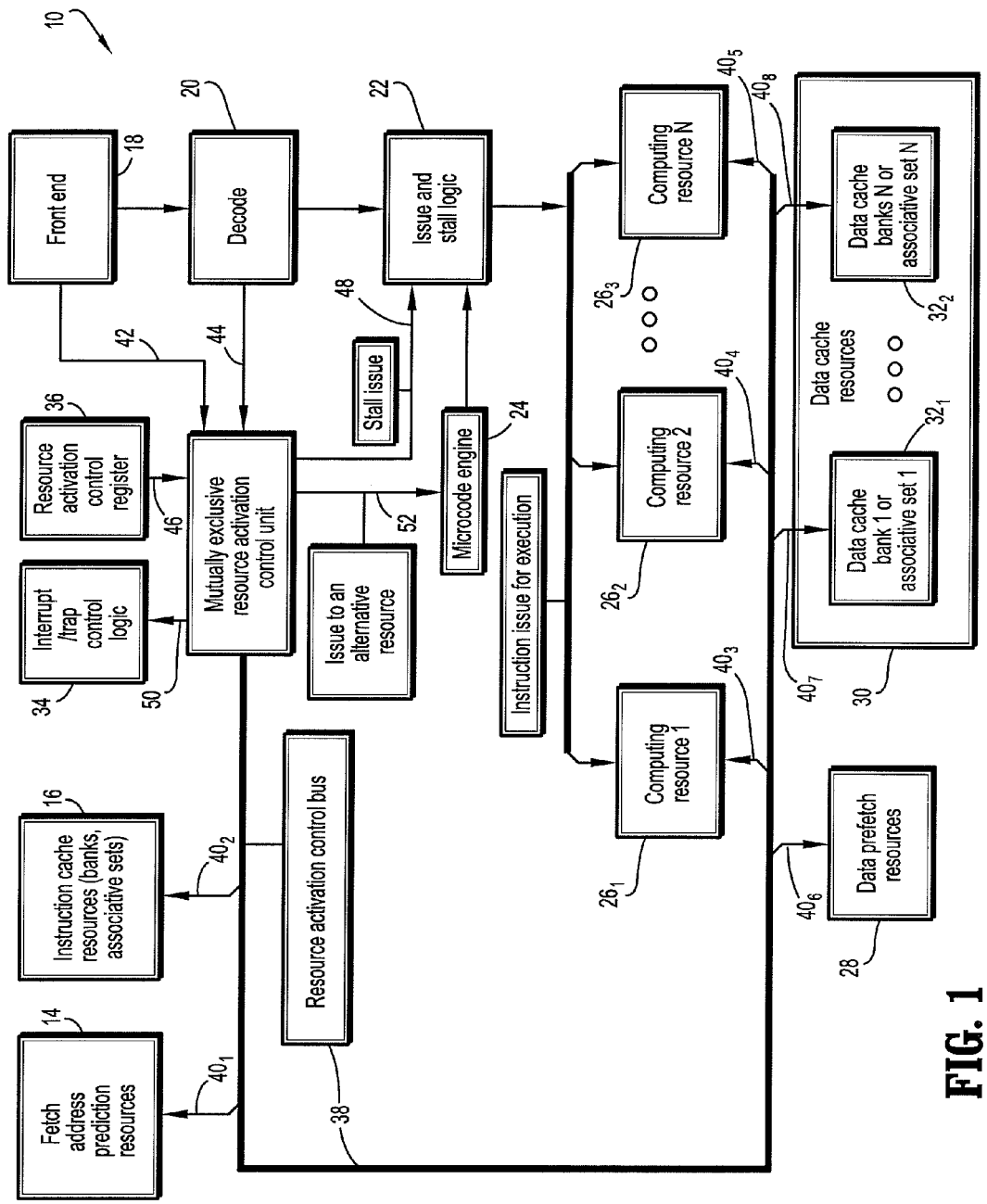
FIG. 1 illustrates a Mutually Exclusive Resource Activation (MERA) control unit and other processor core resources in an exemplary embodiment of the invention.

FIG. 1 illustrates a Mutually Exclusive Resource Activation (MERA) control unit and other processor core resources in an exemplary embodiment of the invention. A processor core 10 is shown. MERA control unit 12 controls the processor core 10's resources in a mutually exclusive manner. Fetch address prediction resources 14, which are coupled to the MERA control unit 12, include address fetching resources, for example, branch predictor(s), link stack, etc. A branch predictor (not shown) can include multiple banks of branch history array, which can be optionally powered on and off independently.

Instruction cache resources 16 include multiple banks of an instruction cache, with optionally implemented functionality that allows gating and activation of the individual instruction cache memory banks. One or more of associative sets of cache can be controlled independently by implementing the gating control for the instruction cache banks at the granularity level of the associative sets of the cache.

Front-end 18 is a front-end for an instruction pipeline. The front-end 18 includes an instruction fetch mechanism and can optionally include a decoupling buffer that decouples the instruction fetch engine (not shown) from the instruction decode and issue pipelines (not shown). Front-end 18 is coupled to the MERA control unit 12 and a decode logic 20. Decode logic 20 is coupled to the front end 18, MERA control unit 12, and an issue and stall logic 22. Decode logic 20 decodes processor instructions and may generate pipeline stalls. Issue and stall logic 22 sends instructions to the execution resources (not shown) for execution. Issue logic 22 can implement buffers that hold instructions for which the operands are not available. Issue logic 22 is coupled to the MERA control unit 12, resources $26_1$-$26_3$, and a microcode engine 24.

Microcode engine 24 implements a designated set of instructions as a microcode. Microcode engine 24 is coupled to the MERA control unit 12 and the issue logic 22. If one of the instructions implemented in the microcode enters the pipeline, the microcode engine 24 stalls the issue of instructions from the main decode issue pipeline, and then issues a series of microcode instruction for execution from the microcode engine 24.

Processor resources $26_1$-$26_3$, which are coupled to the issue logic 22, include functional units, for example, fixed point computations, floating point computations; address computations for loads and stores; branch execution; SIMD (Single Instruction, Multiple Data) and media engines, etc. One or more of the processor resources $26_1$-$26_3$ can maintain the architected state of the processor. Even though only three resources $26_1$-$26_3$ are shown as examples, those skilled in the art will appreciate that any number of resources can be used and each of which alone or as a subset can be deactivated independently.

Power consumption by the processor resources (e.g., $26_1$-$26_3$ shown here) determines to a substantial extent the total power consumed and dissipated by the microprocessor. Hence, reducing and controlling the power consumed by the processor resources (e.g., resources $26_1$-$26_3$) can an achieve control of the overall power of the microprocessor.

Data pre-fetch resources 28 pre-fetch data into a data cache 30 to reduce the number of data cache misses. The data cache 30 includes data cache resources $32_1$-$32_2$ to include multiple banks of the data cache with an optional mechanism that controls the deactivation or activation of the data cache banks. The gating mechanism for the data cache banks can be implemented at the granularity level of the associative sets in the data cache (not shown). The gating mechanism can deactivate one or more of the associative sets of the data cache 30 independently. The data-cache resources $32_1$-$32_2$ are shown as two exemplary banks, though any number of data-cache banks can be used.

Interrupt control logic 34 and a resource activation control register 36 are coupled to the MERA control unit 12. A resource control activation bus 38 couples the MERA control unit 12 to the other resources on the processor core 10 such as the fetch address prediction unit 14, instruction cache resources 16, processor resources $26_1$-$26_3$, data pre-fetch resources 28, and the data-cache 30. MERA control unit 12 is coupled to the front end 18, decode logic 20, issue logic 22 and the microcode engine 24.

A selection or all of the resources such as the fetch address prediction unit 14, the instruction cache resources 16, the resources $26_1$-$26_3$, the data pre-fetch resources 28 and the data-cache 30, implement special input ports $40_1$-$40_8$ which enables them to accept control signals that control the transition of the resources between the active and gated modes. The input ports $40_1$-$40_8$ are shown as connections to the processor resources. The input ports $40_1$-$40_8$ connect the corresponding resources to the MERA control unit 12 through the control activation bus 38.

The MERA control unit 12 controls multiple microprocessor resources by driving appropriate control signals over the resource control activation bus 38. The bus 38 can be implemented either as a set of dedicated point-to-point signals directly controlling the activation of the resources, or as a shared bus which implements a communication protocol. The communication protocol can include various functions, for example, asserting the IDs (identification) of one or more resources that are being activated and the IDs of the resources being deactivated in either single or multiple cycles of the activation control bus 38.

The MERA control unit 12 is coupled to either the decode logic 20 or the front-end 18 of the core 10, or both the decode logic 20 and the front end 18 using a front-end bus 42 and a decode logic bus 44. The MERA control unit 12 uses these connections over the buses 42 and 44 to monitor the activity in the corresponding part of the processor pipeline and uses this information to control the transitions between gated and active modes in all the processor resources connected to the activation control bus 38.

In addition to the MERA control unit 12, the resource activation control register 36 can optionally control the transitions between the active and gated modes of the processor resources. A control register bus 46 couples the control register 36 to the MERA control unit 12.

Control register 36 is controlled through privileged instructions such as reads and writes by the system software (e.g., an operating system, Basic Input Output System—BIOS, etc). Processor architecture can allow setting of the appropriate bits in the resource activation register 36 through a set of instructions. The ISA (Instruction Set Architecture) can provide instructions for register transfers or memory transfers to allow the setting of the appropriate bits in the resource activation register 36; transfers between the resource activation register 36 and other components of the processor; and optionally between the register 36 and memory. The set of instructions can be either designed to allow appropriate bit setting or else an existing instruction set can be modified to provide such capability.

The MERA control unit 12 is coupled to the issue and stall logic 22 by an issue logic connection 48. To control power parameters for the processor, the MERA control unit 12 can enforce stalls for the issue of instructions to the execution resources. The stalls enforced by the MERA control unit 12 can affect either all instructions in the issue stage of the pipeline or one or more of specific instructions designated by the MERA control unit 12. The issue and stall logic 22 can be designed or modified to fully respond to stall requests asserted by the MERA control unit 12.

The MERA control unit 12 can also be connected to the interrupt control logic 34 with an interrupt connection 50 to request an interrupt for program execution and to trap to an interrupt service routine. Interrupt control logic 34 can be designed or modified to fully respond to the interrupt or trap requests asserted by the MERA control unit 12.

The MERA control unit 12 can also be optionally connected to the microcode engine 24 with a microcode bus 52 to activate the microcode engine 24 to issue microcode instructions into the pipeline. The interrupt microcode engine 24 can be designed or modified to fully respond to the microcode issue requests asserted by the MERA control unit 12.

The MERA control unit 12 generates control signals that control the transition of the microprocessor core resources between the active and gated modes, request pipeline stalls, request issue of instructions from the microcode engine and request interrupts using the connections between the core components. The MERA control unit 12 uses these control signals to ensure that the total power of the microprocessor core does not exceed a predefined "P_bound", which is referred to as a bounded power limit.

There is a distinction between the average power and maximum power dissipation. Average power refers to power averaged over a set of applications or programs, typically run by the customer. Saving the average power reduces the energy cost in wired applications, and prolongs the battery life in portable applications.

Maximum power, designated as P_max is power dissipated over a segment of code that utilizes the maximum number of resources in the microprocessor. Such code segments may be an important part of some computation intensive applications, such as scientific computing, in which case it is essential for a processor to be able to deliver the full performance on these code segments. The maximum power sets a requirement on the power dissipating capabilities of the package, and the current delivery capabilities of the power distribution system. Therefore the maximum power has a large impact on the cost of a microprocessor.

The value of P_bound is smaller than the maximum power P_max which can be as large as the sum of the power dissipated by all resources in the processor core. In a microprocessor which implements the current invention the chip power delivery system can be designed to deliver the bounded power P_bound rather than the maximum power P_max. Similarly, in at least one embodiment of the invention, a microprocessor chip package can be designed to dissipate the bounded power P_bound, rather than the maximum power P_max.

The MERA control unit 12 can perform gating in forms of data, power and clock gating. Clock gating is a technique that stops the clock signal coming to a particular latch from switching when that latch is not required to accept and save new data, either because the component driven by the outputs of the latch is not used in that particular clock cycle, or because there is no valid data at the input of the latch, or the old data that had been saved in the latch in one of previous clock cycles needs to be retained. Clock gating can only save the dynamic or switching component of power. Clock gating can be implemented at the granularity of one latch, a group of latches, or at the granularity of a microprocessor resource, such as prefetch unit, or floating point unit, etc.

Power gating (also referred to as Vdd-gating) is one another known power saving technique. This technique consists in inserting header devices between the power distribution network and the power inputs of the microprocessor component. Alternatively, a footer device can be inserted between the ground distribution network and the ground inputs of the microprocessor component. Optionally, both footer and header devices can be implemented. The header devices are typically implemented as PFETs, whereas the footer devices are typically implemented as NFETs. By turning off the header or footer device (or both) the component is disconnected from the power supply or ground or both, which results in reduction of both switching and leakage power.

The power saving techniques described above (e.g., power, data and clock gating) are generically referred to here as "gating". Gating hence refers to any of the three described power saving techniques, or any combination of them. The term "active" refers to a mode when the component is not gated. The MERA control unit 12 is used to activate the gating of microprocessor components or resources, i.e., the MERA control unit 12 switches microprocessor components between the active and gated modes. Switching of a resource to the gated mode is referred to as the deactivation of the resource, and the switching of a resource from the gated mode to the active or normal operation mode is referred to as the activation of the resource.

Figure 2:
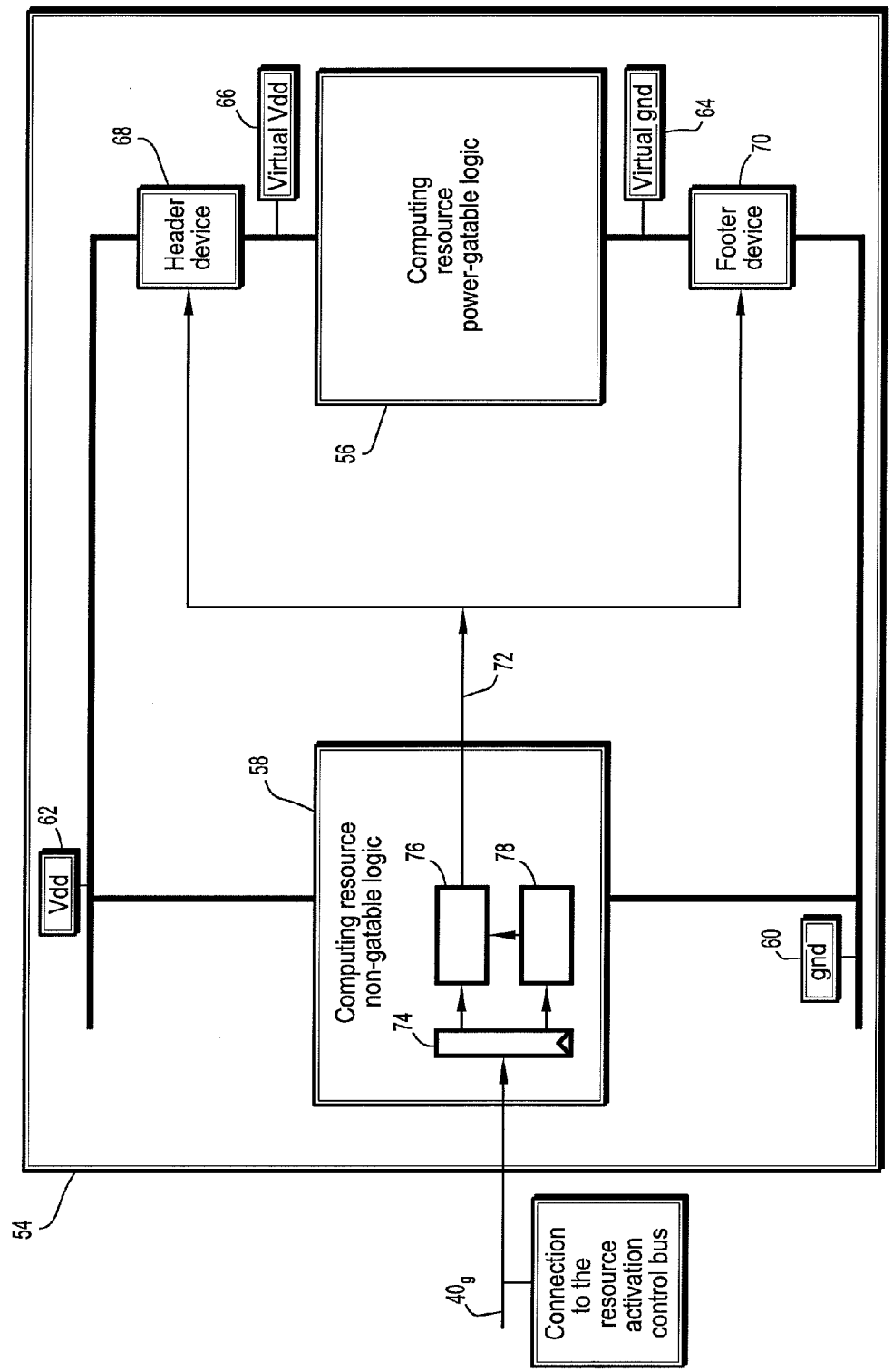
FIG. 2 illustrates an exemplary interface between a microprocessor component and a MERA control unit in an exemplary embodiment of the invention.

FIG. 2 illustrates an exemplary interface between a microprocessor component and a MERA control unit in an exemplary embodiment of the invention. In the exemplary interface power gating is used as a power saving gating technique. Resource 54 is located on the processor core and includes a gatable component 56 and a non-gatable component 58. The non-gatable component 58 can contain some registers or memory arrays which need to preserve the state of the resource 54. For example, if the resource 54 is a floating point unit, then the floating point register file can be implemented as a non-gatable component 58, whereas all functional units, such as an adder, a multiplier, a bypass, etc., can be implemented as a gatable component 56. All circuits in the non-gatable component 58 are connected directly to a ground 60 and a power supply 62. All circuits in the gatable component 58 are connected to a virtual ground 64 and a virtual power supply 66.

The virtual power supply 66 is decoupled from the power supply 62 by a header device 68, and a virtual ground 64 is decoupled from the ground 60 through a footer device 70. The header and footer devices 68 and 70 are controlled through a control signal 72, which is asserted when the resource 54 is directed to enter into the gated mode. Either the footer device 70 or the header device 68 can be absent. If the header device 68 is absent, then the virtual power supply 66 is connected directly to the power supply distribution network 62. If the footer device 70 is absent, then the virtual ground 64 is directly connected to the ground distribution network 60.

The resource 54 is connected to the resource control activation bus 38 through an input port 40₉ (For other similar ports See FIG. 1, 40₁-40₃). Control signal 72 which controls the footer and header devices 68 and 70 may be directly connected to the input port 40₉. In at least one embodiment, the input control signal is latched in a register 74 and goes through additional rebuffering in a rebuffering block 76. There can be multiple pipeline stages inside the rebuffering block 76, separated by pipeline latches.

In at least one embodiment, depending on the implementation of a protocol on the resource activation bus 38 (See FIG. 1), the bus interface logic 78 can be included. The bus interface logic 78 can recognize control signals directed to the resource 54 by matching the resource ID asserted on the resource activation control bus 38 to the ID assigned to this resource 54. In at least one embodiment, the bus interface logic 78 is able to support the bus protocol. Those skilled in the art will appreciate that a variety of protocols can be used.

Figure 3:
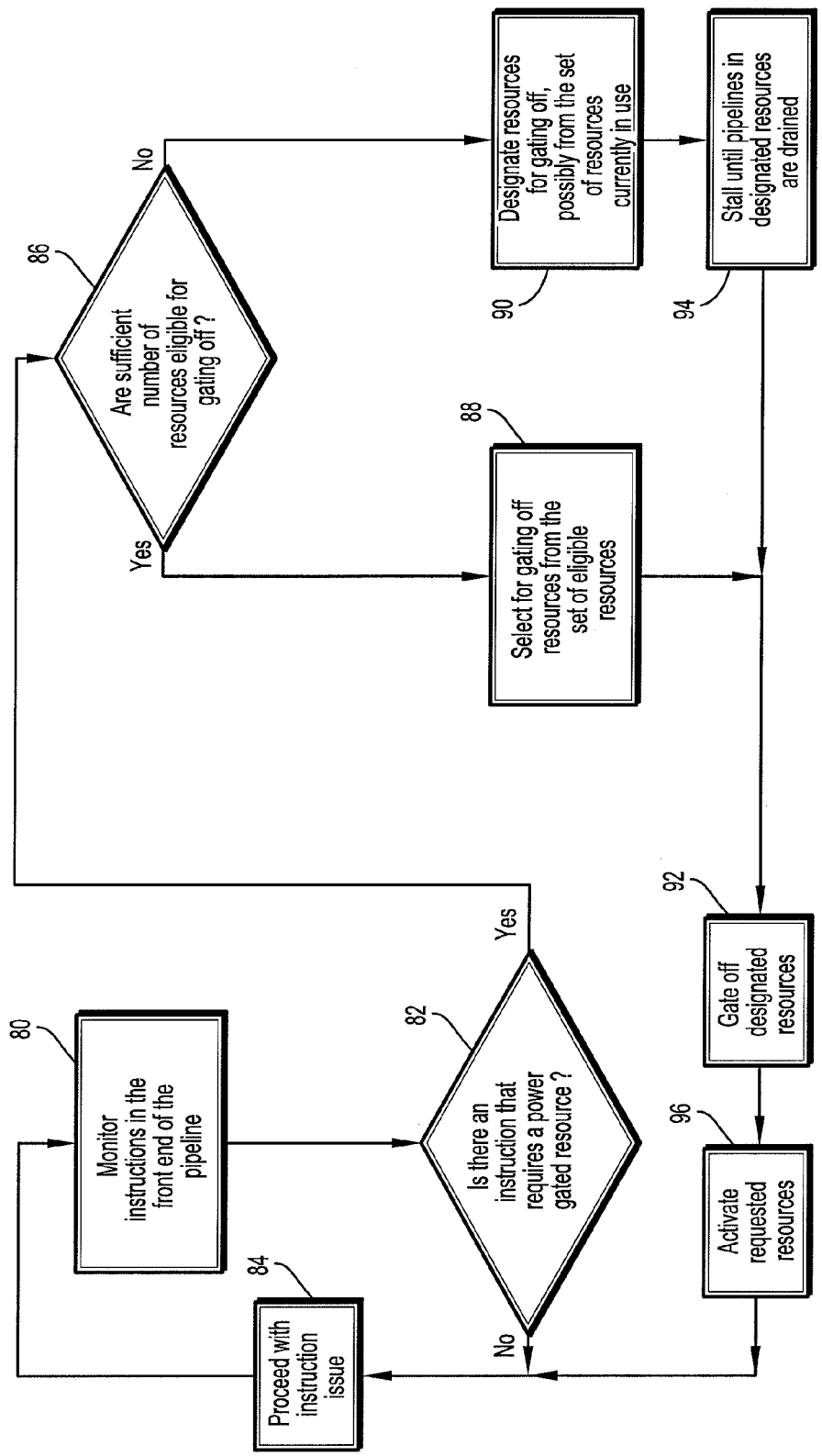
FIG. 3 is a flow diagram that illustrates controlling the deactivation and activation of microprocessor resources in an exemplary embodiment of the invention.

FIG. 3 is a flow diagram that illustrates controlling the deactivation and activation of microprocessor resources in an exemplary embodiment of the invention. In the flow diagram an on-demand (or lazy) resource activation policy and on-demand (or lazy) deactivation policy is applied. During each cycle, the MERA control unit 12 is monitoring the activity in the front end 18 and (optionally) decode logic 20 (See FIG. 1) of the instruction pipeline, as shown in a step 80. This monitoring involves collecting resource usage information either from the instructions stored in an instruction buffer (not shown), or for instructions going through the decoding stage 20.

For every cycle, for each instruction or a group of instructions designated for issue from the instruction buffer, or going through the decode logic 20 (See FIG. 1), a check is performed at a step 82 whether any of the instructions requires access to a resource that is unavailable, i.e., the resource is currently gated off. If no instruction requires a gated resource, then the instruction or group of instructions are allowed to proceed with the process of decoding and issuing at a step 84. If one of the requested resources is marked as gated off (i.e., unavailable), then the MERA control unit 12 checks the eligibility of resources for being gated off (transition to step 86). At a step 84, the instruction or group of instructions is allowed to proceed with the decoding and issue process as normal because none of the instructions in the present issue and decode cycles requires a gated (and thus unavailable) resource.

Step 84 completes the "normal" execution loop, i.e., transitions along the steps 80, 82, 84 and 80. This loop is expected to be cycled in most of the execution cycles for programs exhibiting a regular behavior. When the program cycles through this normal loop no action associated with the MERA control mechanism as implemented through the MERA control unit 12 (See FIG. 1) is performed, and no performance penalty is incurred.

Figure 9:
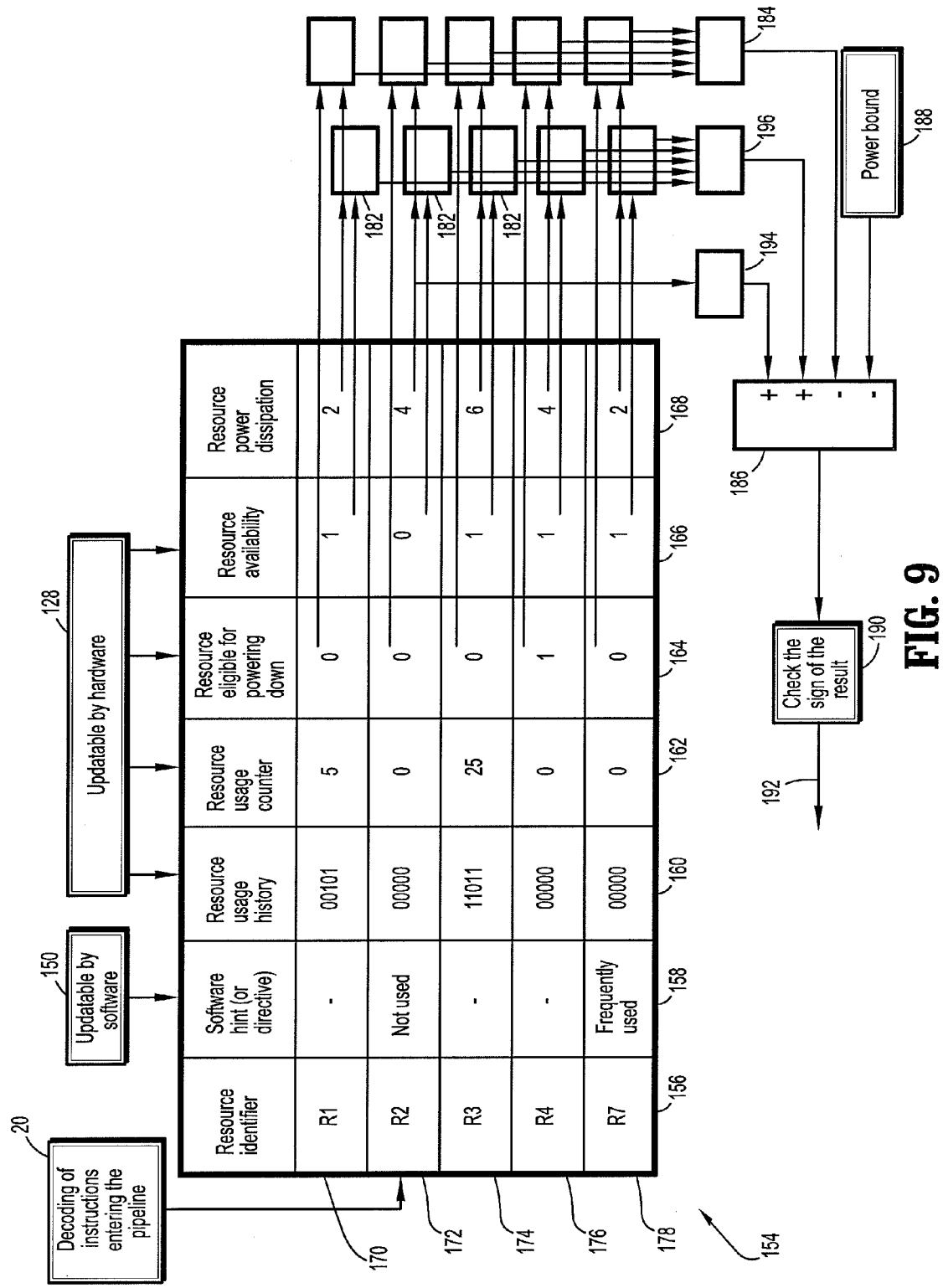
FIG. 9 illustrates an exemplary hardware structure for controlling power-gating in an exemplary embodiment of the invention.

Second loop of steps 80, 82, 86, 88, 92, 96, 84 and 80 is referred to as a "program phase change loop". If at the step 82 any instruction requires a gated resource then control shifts to step 86. At a step 86, the MERA control unit 12 checks if sufficient numbers of resources are eligible for being gated off to allow the activation of the requested resource without exceeding the power bound P_bound. For the computation in the step 86, the hardware (an example of such hardware is shown in FIG. 9 which is described below) calculates the sum of power weights of resources that are not marked as eligible for gating off (that is those that will remain active) and those that are requested to be activated. If the sum is equal or smaller than the predetermined power bound P_bound, then the control flows to a step 88, else the designation of resources for gating is performed at a step 90.

At the step 88 a set of resources is selected for gating off from the list of resources that are marked as eligible for gating off at the step 86. If more resources were marked eligible for gating off than needed for maintaining the processor power below the bound P_bound, then the resources for gating may be designated using either the least recently used algorithm or using software hints, or any other algorithm (including a random technique). Step 88 is followed by a step 92 at which all designated resources are deactivated. At the step 92, the MERA control unit 12 directs the resources designated for gating to switch to the gated mode by asserting appropriate signals on the resource activation bus 38.

At a step 96 the MERA control unit 12 activates the resources requested to be activated by asserting appropriate control signals on the resource activation bus 38. At the step 96 a number of stall cycles may be enforced by the MERA control unit 12 to allow the resources that were signaled to be activated to complete the activation procedure before any instruction is issued to them. Additional stall cycles at the step 96 may be needed to prevent the temporary power increase caused by the activation procedure in the resources being activated, or to reduce possible spikes in current consumption.

Step 96 completes the second loop of steps 80, 82, 86, 88, 92, 96, 84 and 80, referred to as a "program phase change loop". This loop is expected to be occasionally taken by "well-behaved" programs when they enter a new program phase which uses a new set of resources. The program phase change loop incurs either zero or minimum performance penalty. The performance penalty, if any, may result from the stall cycles that may be needed to allow the resources being activated at the step 96 to become ready for processing new instructions before the instruction that requested these resources is allowed to issue. Additional stall cycles may be enforced by the MERA control unit 12 at the step 96 to prevent the temporary power increase caused by the activation procedure in the resources being activated, or to reduce spikes in current consumption.

If at the step 86 the MERA control unit 12 cannot find a sufficient number of resources eligible for gating, the MERA control unit 12 initiates step 90. At the step 90 the selection of resources for gating is performed. Unlike step 88, in step 90 all resources are considered for selection as candidates for deactivation, including those that are currently in use. Resources for deactivation are designated in such a way that the sum of the total power of all resources that are not designated for deactivation (that is resources remaining active) and the power of resources requested for activation must not exceed the predefined power limit P_bound. Any technique for the selection of resources for gating off can be used, including techniques such as random selection. As an optional performance-optimizing feature the selection of resources for deactivation can be performed such that the likelihood of the MERA control unit 12 going to the step 90 in the future is minimized.

At a step 94, the pipelines in resources designated for deactivation are allowed to drain before the deactivation sequence is initiated by the MERA control unit 12. The draining of the pipelines allows all instructions that are being processed (including those that are queued at the issue stage) by the designated resource to finish their execution. At step 94 the MERA control unit 12 can optionally penalize the program thread that was determined as exhibiting irregular behavior by enforcing cycles of stall, initiating microcode issue, and switching execution priorities for the thread to a lower level. The MERA control unit 12 can also optionally report the irregular activity to the system software with an interrupt.

Step 92 completes the third loop of steps 80, 82, 86, 90, 94, 92, 96, 84 and 80 referred to as an "irregular behavior loop". This irregular behavior loop is expected to be taken only very rarely by "well-behaved" programs. The process of cycling through the irregular behavior loop results in a larger performance penalty than going through the phase change loop.

The requested resources are not activated until the resources designated for deactivation complete the deactivation procedure, even though this may incur performance penalty. This ensures that the lowered-than-maximum bound on power of the core, P_bound, is maintained possibly even at a penalty of performance loss in programs that exhibit irregular behavior, i.e., the programs that do not comply with the resource usage guidelines specified for the given microprocessor core.

Figure 4:
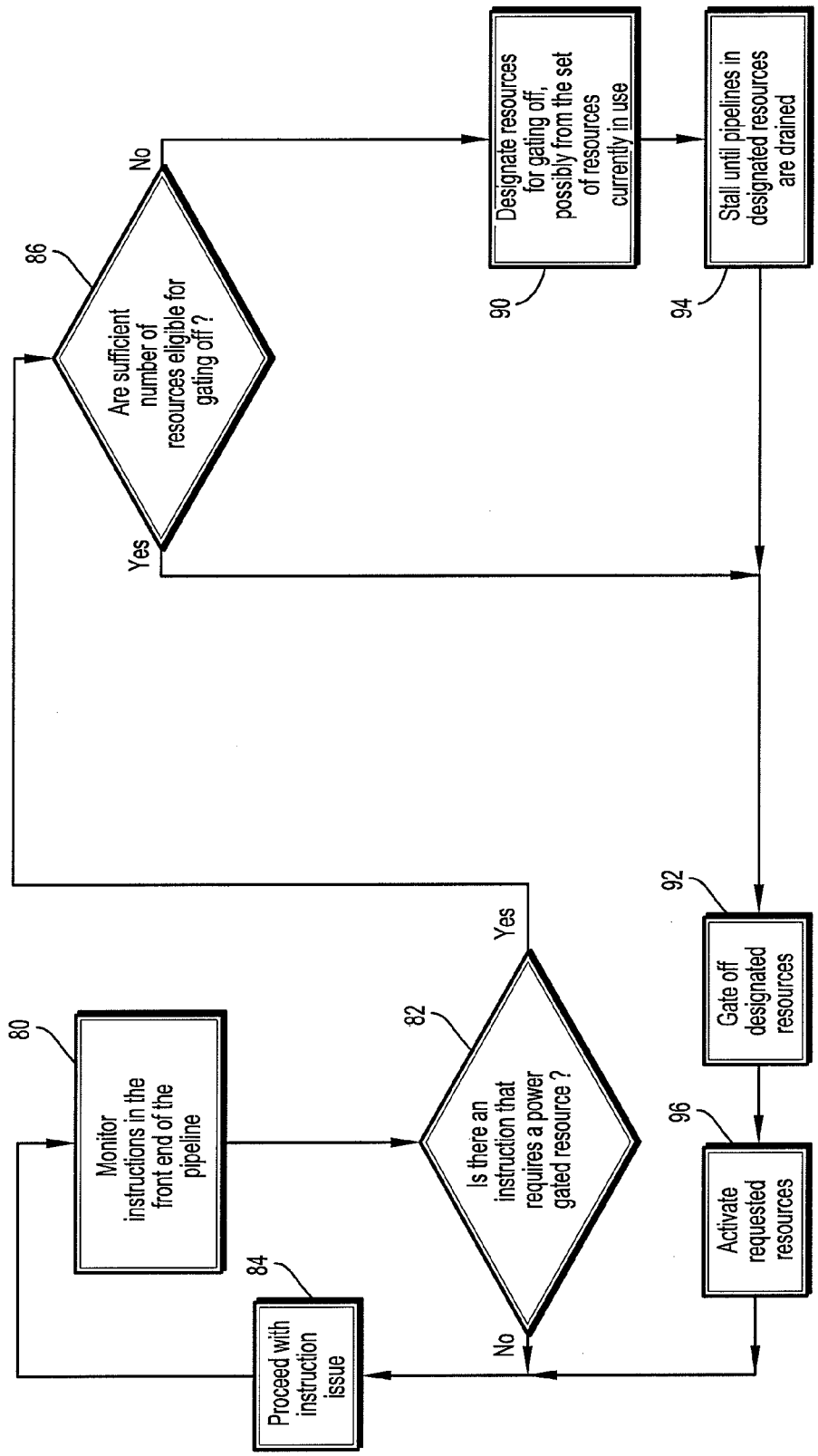
FIG. 4 is a flow diagram that illustrates controlling the deactivation and activation of microprocessor resources in an exemplary embodiment of the invention.

FIG. 4 is a flow diagram that illustrates controlling the deactivation and activation of microprocessor resources in an exemplary embodiment of the invention. The normal execution loop performs as described above in context of FIG. 3. The phase change is modified as described next. All of resources marked eligible for gating off in step 86 are selected for gating off, which eliminates the need for having a step 88 as shown in FIG. 3 where only some resources are selected for gating off from a set of eligible resources. Step 86 is directly followed by a step 92 at which all eligible resources are deactivated.

All eligible resources are gated off. Hence, more resources are gated off than necessary to keep the power below P_bound. This can enable additional reduction in the average power, however, as a result there is a higher chance that at step 80 an instruction is encountered that requires a gated resource. Therefore the frequency of the passing through the phase change loop may increase. The irregular behavior loop is as described in context of FIG. 3 above.

Figure 5:
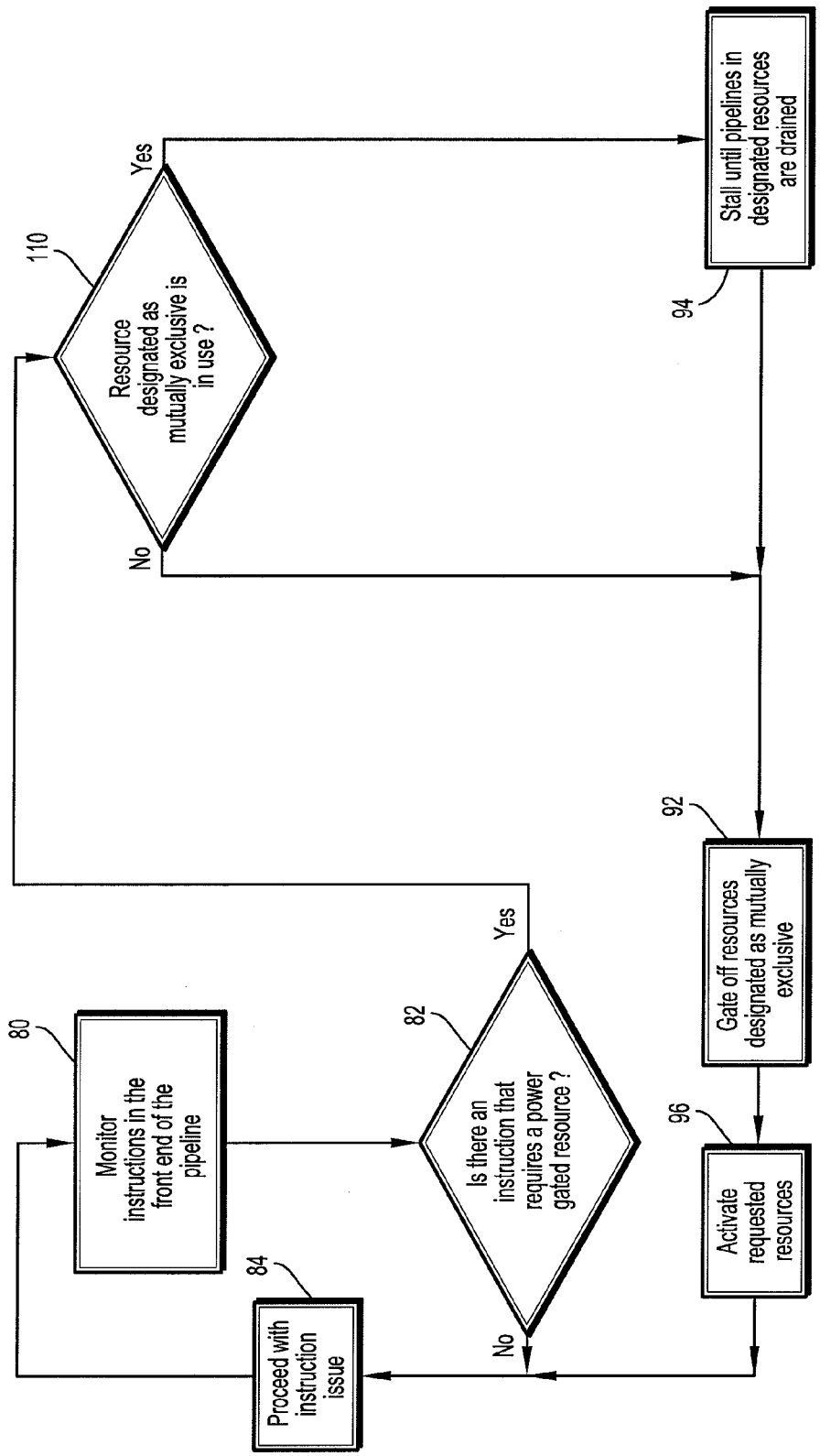
FIG. 5 is a flow diagram that illustrates on-demand activation and deactivation policies for pairs of resources stored in a table in an exemplary embodiment of the invention.

FIG. 5 is a flow diagram that illustrates on-demand activation and deactivation policies for pairs of resources stored in a table. The normal execution flow loop of steps (80->82->84->80) is as described above in the context of FIGS. 3 and 4. For the phase change loop, the control flow follows the flow in FIG. 3 from step 80 to step 82.

At the step 110, the MERA control unit 12 checks for the resource (or a group of resources) requested for activation. The MERA control unit 12 checks if the resource (or a group of resources) which has been designated as mutually exclusive with respect to the resource requested for activation is currently in use if the MERA control unit 12 or another processor element implementing the mutually exclusive technique in an embodiment of the invention determines that none of the resources designated as mutually exclusive with respect to the resource requested for activation is currently in use, the MERA control unit 12 directs control to go to the step 92, and follows a sequence of steps 92->96->84->80 as is shown in FIG. 3.

Figure 8:
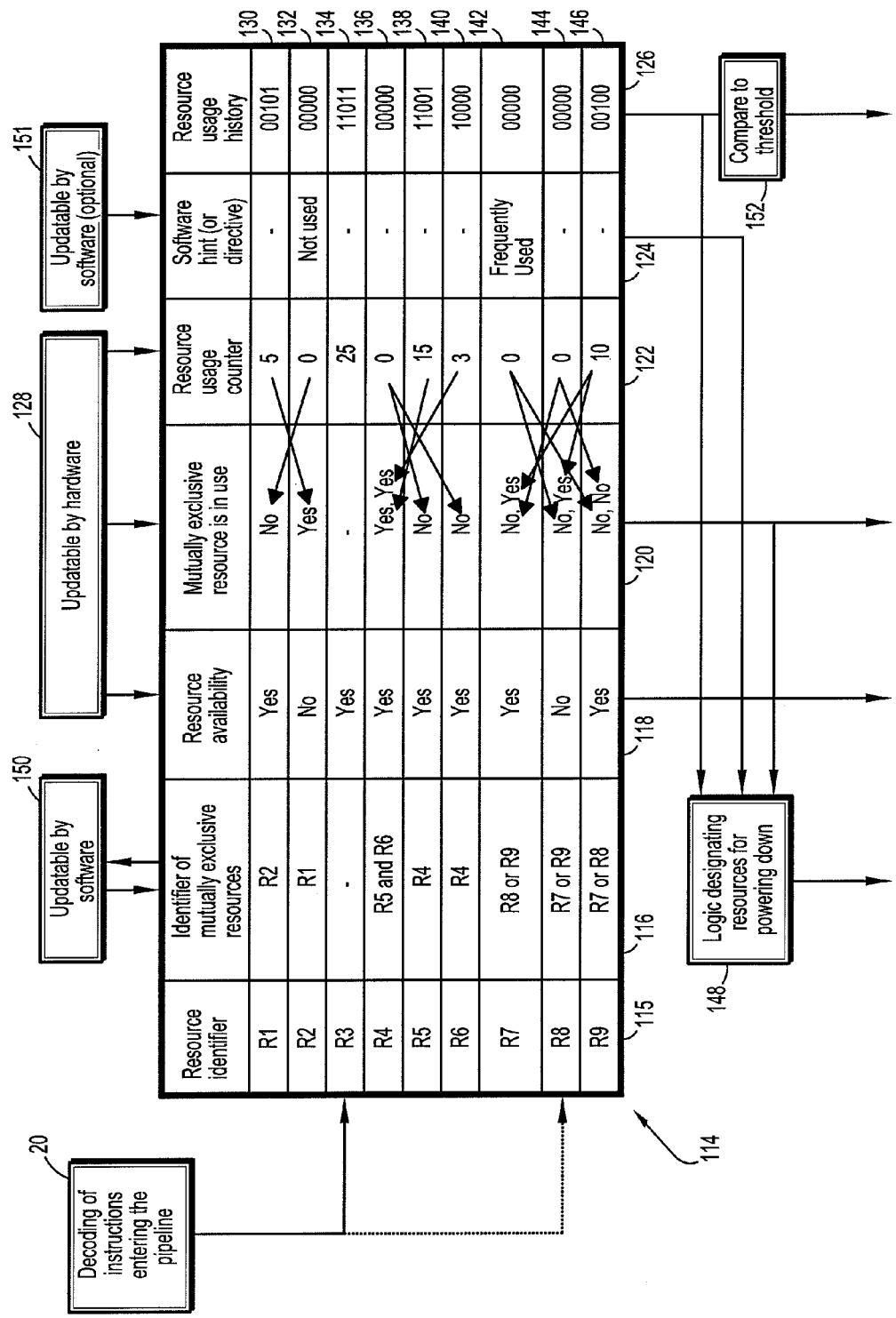
FIG. 8 illustrates a table based hardware structure to check the need for and to specify mutually exclusive resources (or groups of resources) in an exemplary embodiment of the invention.

If at least one of the resources designated as mutually exclusive to the resource (or group of resources) requested for activation is used or is scheduled to be used by one or more instructions in the pipeline, the process transitions to the step 94. Next the sequence of steps (94->92->96->84->80) is same as for the irregular behaviour and described above in context of FIG. 3. For the computation in the step 86, the hardware (an example of such hardware is shown in FIG. 8 which is described below) looks up a table that stores for every resource a list of resources designated as mutually exclusive to it, and bits that indicate whether the resources are currently in use.

Figure 6:
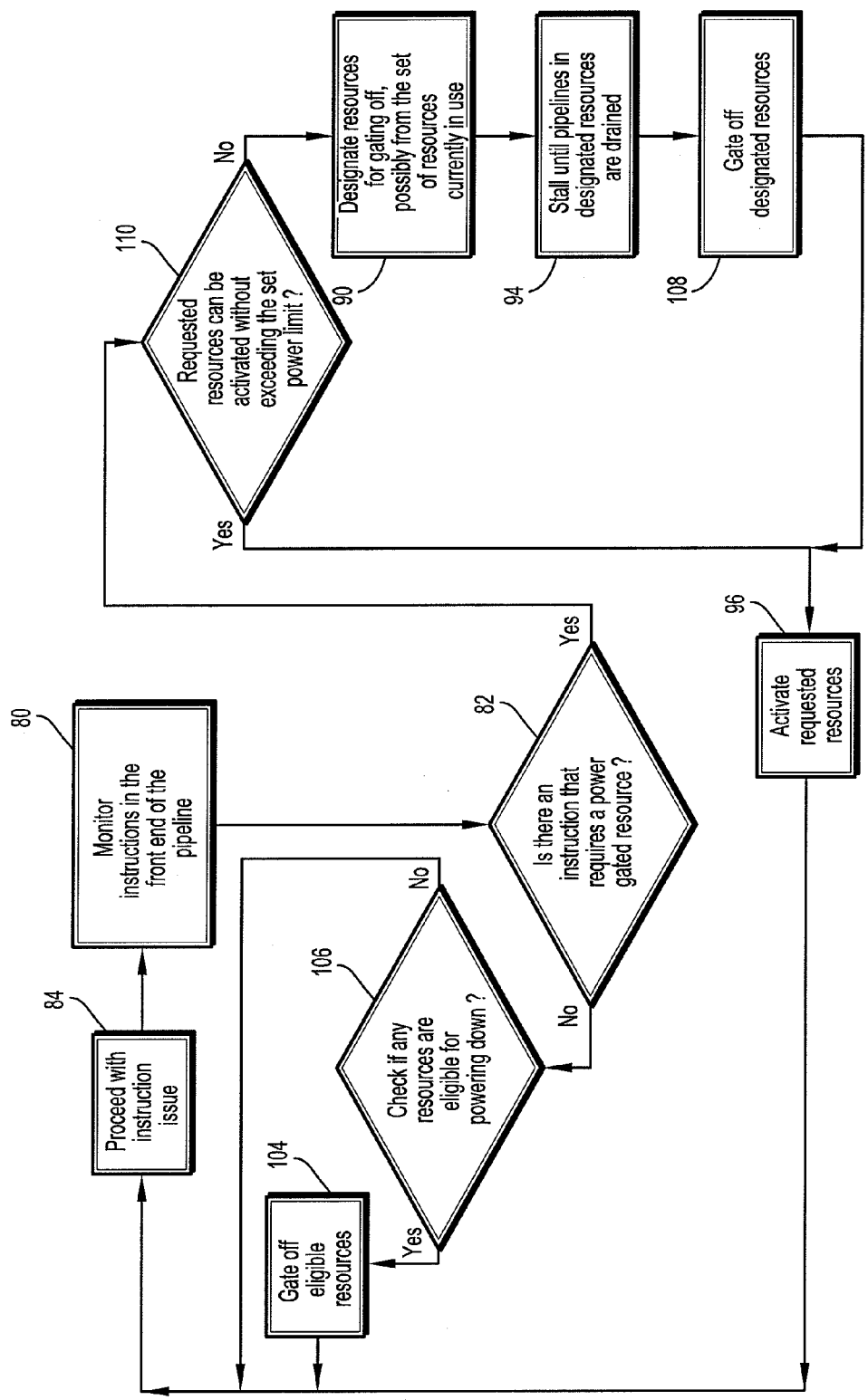
FIG. 6 is a flow diagram that illustrates controlling the deactivation and activation of microprocessor resources in an exemplary embodiment of the invention.

FIG. 6 is a flow diagram that illustrates controlling the deactivation and activation of microprocessor resources in an exemplary embodiment of the invention. An on-demand (or "lazy") resource activation policy and "eager" deactivation policy is implemented to reduce the average power in addition to the reduction in the maximum power of the microprocessor P_max. Eager (or "greedy") and "lazy" policies in general are terms that are used to qualify a specific heuristic procedure. Eager or greedy policy generally means that a certain decision is activated at the earliest available or feasible opportunity, even in a predictive manner or proactively, in anticipation of an event; lazy policy means that the decision is delayed to the latest possible time.

Three loops of steps are used: the normal execution loop, the program phase change loop and the irregular behavior loop. The decision for gating the resources and the step of gating the designated resources is implemented as part of the normal execution loop. The normal execution loop's path goes through the steps 80, 82, 106, 104 and 84, or 80, 82, 106 and 84.

If none of the resources are requested for activation, then a step 106 is executed. At the step 106, the MERA control unit 12 checks if any of the processor resources are eligible for deactivation. For a resource to be eligible for deactivation it must not be used by any instruction in the pipeline. Further, the history of resource usage and an optional software hint are used in designating resources for deactivation at the step 106. Any of the known predictors of resource quiescence can be used. If one or more resources are identified at step 106 as eligible for deactivation, then they are deactivated at a step 104 and instructions are allowed to proceed with the decode and issue process in the step 84. Otherwise, the control path goes directly to the step 84. Step 84 completes the normal execution loop.

If one or more resources are requested for activation in step 82, the control goes to a step 110. At a step 110, the MERA control unit 12 (See FIG. 1) checks if the resources requested for activation can be activated without exceeding the predetermined power bound P_bound. The mechanism for checking this condition is similar to that used in the step 86 as shown in FIG. 3 and described above. The hardware (an example of such hardware is shown in FIG. 9 which is described below) computes the sum of power weights of resources that are active, and those that are requested to be activated. If the sum is equal or smaller than the predetermined power bound P_bound then the process proceeds to a step 96. Otherwise the designation of resources for gating is performed at the step 90.

At the step 96 the MERA control unit 12 activates the resources requested to be activated. Step 96 completes the program phase change loop. If at step 110 the MERA control unit 12 cannot find a sufficient number of resources eligible for gating then the MERA control unit goes to step 90, where the selection of resources for gating is performed. The sequence of steps 94 and 108 which are similar to above described steps 94 and 92 in FIG. 3 completes the irregular behavior loop.

Figure 7:
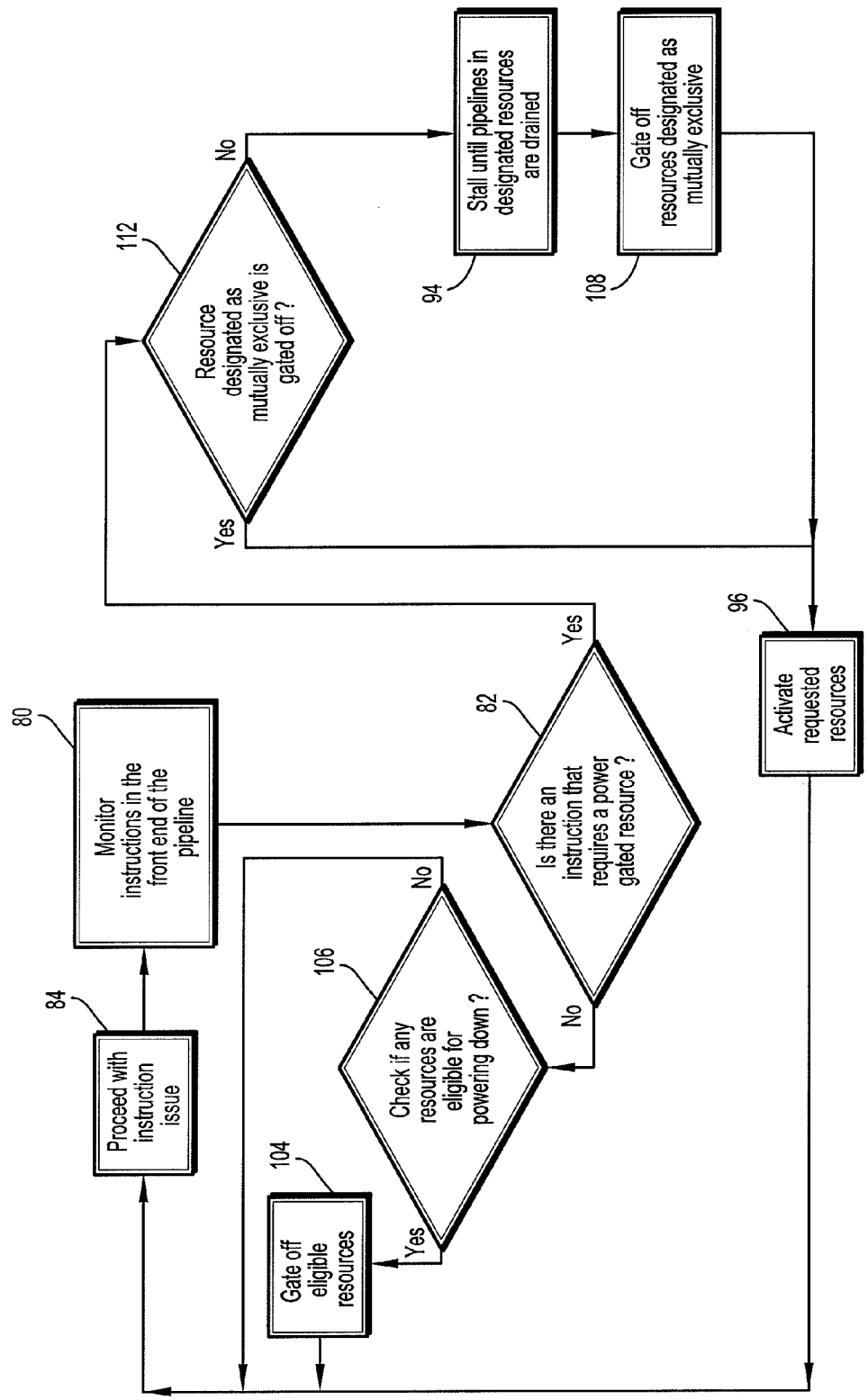
FIG. 7 is a flow diagram that illustrates controlling the mutually exclusive activation of resources using eager resource deactivation and on-demand resource activation policy in an exemplary embodiment of the invention.

FIG. 7 is a flow diagram that illustrates controlling the mutually exclusive activation of resources using eager resource deactivation and on-demand resource activation policy in an exemplary embodiment of the invention.

The normal execution flow loop follows either the steps 80->82->106->104->84 or the steps 80->82->106->84->80. For the phase change loop, the control flow follows the sequence step 80 to a step 112 as described above in the context of FIG. 6. At the step 112, the MERA control unit 12 checks for the resource (or a group of resource) requested for activation, if the resource (or a group of resources) which have been designated as mutually exclusive to those requested for activation have already been gated off. If the answer to this check is "yes", then the control goes to the step 96. If the answer at the step 112 is "no" to the designation of resources as mutually exclusive, that is if at least one of the resources designated as mutually exclusive to the resource (or group of resources) requested for activation has not been deactivated, the process transitions to the step 94. The rest of the sequence of the steps 94->108->96->84 is similar to that described above in the context of FIG. 5, along with the manner of specifying the set of mutually exclusive resources (or groups of resources).

FIG. 8 illustrates a table based hardware structure used to check the need for and to specify mutually exclusive resources (or groups of resources) in an exemplary embodiment of the invention. Multiple techniques can be used for specifying the set of mutually exclusive resources (or groups of resources) for the MERA control unit 12 (See FIG. 1). In at least one embodiment, the mutually exclusive set of resources is an exemplary table 114 implemented in hardware and referred to as a mutually exclusive resource identifier table. Also, a set of instructions are added to the processor ISA (Instruction Set Architecture) that allow the privileged (or system) software to write and read the entries in the mutually exclusive resource identifier table. The table 114 includes columns 115-126 and rows 130-146.

The table 114 has an entry (shown as rows) for each resource controlled by the MERA control unit 12 through the resource activation bus 38 (See FIG. 1). The table 114 is indexed with the resource identifier in column 115, and it may implement multiple read ports. Multiple ports may be required to read out more than one line from the table. Even though the connection to the decode logic 20 (See FIG. 3) is shown as one line, the bandwidth can be anywhere from 1 to N instructions per cycle (e.g., N=8).

For each group of instructions entering the pipeline, the decode logic 20 identifies resources needed for executing each group of instructions. The identifiers of the requested resources can also be determined by the pre-decode logic, and stored in the instruction cache together with the instructions. Table 114 is accessed using a calculated index (or a set of indexes) (not shown).

For each resource the resource table 114 stores the identifiers of the mutually exclusive resources (shown in the column 116). Column 116 stores the identifiers or the resources that are designated as mutually exclusive with respect to the resource corresponding to this row. Column 116 of the table 114 can be maintained by the system software. The ISA (Instruction Set Architecture) of the processor implements instructions for loading the entries of column 116 of the table and also implements instructions for storing the contents of column 116 of the table to the memory or for moving data between the table 114 and one or more of the processor architected registers. These extra instructions are only executable when the processor is running in the privileged mode. Column 116 is initialized during the system boot. The writing to column 116 of the table 114 and reading from it by the software is done via the port 150. The data for updating column 116 comes from the resource activation control register 36 shown in FIG. 1. Alternatively, the entries in the column 116 may be pre-loaded by hardware during system power-up, for example, by preloading through the scan chain.

As shown, more than a single resource can be entered in the column 116 of the table. Either "OR" or "AND" rules are allowed for specifying the mutually exclusive resources in column 116 of the table. For the example shown, in order for a resource R4 (row 136) to be activated both resources R5 and R6 must be gated off (row 136; column 116). The resource identifier in column 116 functions as an "ANDed" pair (or string) when the power of the resource in column 115 of the table equals or is close to the sum of the power of several resources. In the present example, the power of resource R4 is close to the sum of the power dissipated in resource R5 and R6.

The resource identifiers entered in column 116 as an "ORed" pair (or string) allows flexibility in selecting resources for deactivation. As an example, for the resource R7 (row 142) to be activated either resource R8 or R9 must be deactivated (row 142; column 116). Similarly, in order for resource R8 (row 144; column 115) to be activated, either resource R7 or R9 must be deactivated (row 144; column 116), and in order for resource R9 (row 146) to be activated, either resource R7 or R8 must be deactivated (row 146; column 116). Then, if resource R8 (row 144) is requested for activation while resource R9 (row 146) is currently in use but resource R7 (row 144) is not, then the hardware will designate resource R7 (row 144) for deactivation, and allow the MERA technique to proceed on the phase change loop (See FIGS. 5 and 7), rather than the irregular behavior loop.

Column 118 of the table indicates whether the resource in the corresponding row is currently available (i.e., active). An entry in column 118 is set as "resource available" whenever the corresponding resource is activated, and it is set as "resource unavailable" whenever the corresponding resource is gated off. Entries in column 118 are automatically updated by the hardware via a port 128. The bits read out of column 118 are used in step 82 as shown in FIGS. 5 and 7 to select whether to continue to the normal execution loop, or to continue to the step 86 in FIG. 5 (step 112 in FIG. 7).

Entries in column 120 of the table indicate whether there are any instructions in the pipeline that are using (or scheduled to use) the resources listed in the column 116 of the corresponding row. Entries in column 120 are also automatically updated by hardware port 128. For each resource entered in column 116 as an "ORed" or "ANDed" string, the hardware maintains a separate bit in column 120.

Every time the table 114 is accessed with a resource index, the indexed entry in column 120 is read out of the table along with the corresponding bits in the columns 116 and 118. The bits read out of column 120 are used for two purposes. First, these bits are used to make a decision whether the MERA control unit 12 (See FIG. 1) should go to the program phase change loop or the irregular behavior loop from the step 86 (or 112) (See FIGS. 5 and 7). For example, if resource R1 (row 130) is requested for activation, the bit from row 130 column 120 will indicate that resource R2 designated as a mutually exclusive resource to R1 is not currently in use, and the MERA control unit 12 will continue to the phase change loop from the step 86 (112) in FIGS. 5 and 7. But if resource R2 (row 132) is requested for activation, the bit from the row corresponding to resource R2 read out of column 120 will indicate that the resource R1 which is designated as a mutually exclusive resource to R2 is currently in use, and the MERA control unit 12 will continue to the irregular behavior loop from the step 86 (112) in FIGS. 5 and 7.

The bits read out from column 120 are used by the selection logic 148 for designating resources for deactivation, when there are multiple options for the selection of the resources for deactivation (which happens when several resources are entered in column two, using an "OR" rule). For example, if the resource R7 is requested for activation, the information read out of column 116 will specify that either resource R8 or R9 must be deactivated. The bits read out of column 120 will indicate that the resource R8 is not in use, whereas resource R9 is currently in use. In this case the selection logic 148 selects resource R8 for deactivation. Then the MERA control unit 12 will continue on the phase change loop after step 86 (112) as shown in FIGS. 5 and 7 without incurring the performance penalty of the irregular behavior loop.

Bits in column 120 of the table 114 are updated on a cycle-by-cycle basis, based on the values or the resource usage counters stored in column 122 as: whenever the resource usage counter is set to zero for a particular resource, all "mutually exclusive resource is in use" entries in column 120 corresponding to this resource are set to "no". Whenever the resource usage counter is set to a non-zero value for a particular resource, all entries in column 120 corresponding to this resource are set to "yes". For example, since the resource usage counter corresponding to the resource R4 (row 136) is at zero in the present example, both entries in rows 138 and 140 in column 120 are set to "no".

The hardware needed to update entries in column 120 based on entries in column 122 involves circuits detecting zero values, and logic that first finds the appropriate entries in column 120 that require an update and performs the needed update(s) using the write port 128. The search for the entries in column 120 that require an update when the resource usage counter for a particular resource changes to or from the zero value may involve scanning entries in column 116 to detect which rows list this resource as a mutually exclusive. Alternatively, the hardware can maintain a table with a reverse mapping to column 116. For example, the reverse mapping table would list resource R2 in row 130, resource R1 in row 132, and resources R5 and R6 in row 136.

Column 122 in the table 114 maintains the resource usage counter for each of the resources. The counters in column 122 are updated on a cycle-by-cycle basis by the hardware via the port 128. Whenever an instruction enters the pipeline that uses a particular resource, the counters in the corresponding entries in column 122 are incremented. Whenever an instruction that uses a particular resource completes the execution (that is it retires from the processor pipeline) or is flushed from the pipeline, counters in the corresponding entries in column 122 are decremented. For example, if an instruction enters the pipeline that uses resource R1, the counter corresponding to resource R1 in row 130 column 122 will be incremented from value 5 to value 6. Non-zero values in the counters in column 120 indicate that the corresponding resource is currently in use. Zero values of the counters indicate that the corresponding resource is not in use.

Column 124 in the table 114 stores a software hint, which is intended to relate information about the usage of the corresponding resource known to the software. The column 124 like column 116 is updatable by software via port 150. Instructions for writing the software hint column may be available to both system and user code. Examples of software hints include "not used", which means that the corresponding resource is not expected to be used by this program, or "frequently used", which means that the corresponding resource expected to be frequently used by this program. The software hint is read out of the table whenever there are multiple options for designating resources for deactivation, and is used by the logic designating resources for deactivation 148. For example, if resource R9 is requested for activation, either resource R7 or R8 must be deactivated. Since neither of these resources is currently in use, the selection logic 148 will use information read out from column 124 for both resource R7 and R8. The software hint for resource R7 indicates that it is likely to be used again by this program. Then resource R8 will be designated for deactivation, and resource R7 will remain in the active mode. The software hint column 124 in the exclusive resource identifier table is optional. Updates for the software hint column 124 come from the resource activation control register 36 in FIG. 1.

The table 114 can optionally implement column 126 that stores the history for the usage of the resources. This usage history information may be used by the selection logic 148 that designates resources for deactivation. Whenever there are multiple options for designating resources for deactivation, and the decision cannot be made based on the bits read out from columns 120 and 124, the selection logic 148 would use the usage history information to make the decision. Those resources that are used less often (or less recently) would be selected for deactivation.

The usage history information in column 126 is also used for selecting resources for deactivation in the step 106 as shown in FIGS. 6 and 7 where the resource usage history column 126 keeps count of how many times every resource was used in the recent history, or how many cycles ago the resource was used for the last time. The data read out of column 126 is compared to a threshold value which can be set by the privileged software for every resource or group of resources individually. If the resource usage counter value drops below the threshold set for this resource, the comparison logic 152 signals to MERA control unit 12 in FIG. 1 that the resource is eligible for deactivation at step 106 (see FIGS. 6 and 7). Similarly, in an embodiment that maintains counters indicating the last cycle that the resource was used, if the counter exceeds the threshold set for this resource, the comparator logic 152 signals to MERA control unit 12 (See FIGS. 6 and 7) that the resource is eligible for deactivation at step 106. This information is used by the MERA control unit 12 to make the decision at step 106. This is only applicable to the embodiments shown in FIGS. 6 and 7 which implement the eager policy for the deactivation of resources.

The above described table 114 is an illustration, and those skilled in the art will appreciate that numerous variations in the implementation of the resource identifier table are possible, for example, different ordering of the columns, transpositions of the table, different indexing mechanism, different policies for updating various fields in the table (such as update column 126 on only even cycles). Also various combinations of software and hardware update mechanisms are possible for different columns. Further, only some of the columns in the table may be implemented as per the needs of a specific application.

FIG. 9 illustrates an exemplary hardware structure for controlling power-gating in an exemplary embodiment of the invention. A MERA control unit used in at least one embodiment of the invention is described next. Resource usage table 154 provides information needed for controlling the flow of the MERA unit at several steps. Column 156 includes resources identifiers; column 158 includes software hints/directive; column 160 includes resource usage history; column 162 includes resource usage counters; column 164 includes resources bits indicating the eligibility resources for deactivation; column 166 includes resource availability indicators; and column 168 includes resource power indicators. Rows 170-178 are assigned to resource identifiers R1-R7. These columns 156-162 are updated in a manner similar to that described for the table 114 above in the context of FIG. 8.

Column 164 of the resource usage table 154 shows if the resource in the corresponding row is eligible for deactivation. A column 164 entry of "1" indicates eligible and an entry of "0" indicates the resource is not eligible for deactivation. These bits are updated by hardware, based on the values in columns 158, 160 and 162 of the corresponding row. If the resource usage counter in column 162 is not zero then the corresponding resource is not eligible for deactivation. If the software hint in column 158 indicates that this resource is frequently used by this program then the corresponding resource is not eligible for deactivation. Otherwise, if the resource usage history in column 160 is below a predefined (software updatable) threshold, and/or the optional software hint indicates that this resource is not likely to be used by this program, the corresponding bit in column 164 is set to "1", indicating that the resource is eligible for deactivation.

Column 168 of the resource usage table stores the power for every resource. These values can either be loaded at the system power-up, or can be hard-coded at the manufacturing time.

Values from columns 166 and 168 are read out of the table 154 at every cycle and forwarded to circuits 182. If the value in the column 166 is "1", then the corresponding data gating circuit 182 forwards the value read out from column 168 to the multi-input adder 196, otherwise, if the value in column 166 is "0", the gating data gating circuit 182 forward zero to the multi-input adder 196. Multi-input adder 196 sums the values from all rows, and forwards the result (which is the total power of all resources that are currently active) to the multi-input adder 186.

Values from columns 164 and 168 are read out of the table every cycle and forwarded to the data gating circuits 182. If the value in the column 164 is "1", then the corresponding data gating circuit 182 forwards the value read out from column 168 to the multi-input adder 184, otherwise, if the value in column 164 is "0", the gating data gating circuit 182 forward zero to the multi-input adder 184. Multi-input adder 184 sums the values from all rows 170-178, and forwards the result (which is the total power of all resources available for deactivation) to the multi-input adder 186. The value received from the adder 184 is subtracted from the result in the adder 186 (i.e., the value changes the sign before being added to the rest of the operands).

The value from the column 168 for the resource that is requested for activation is also forwarded to the multi-bit adder 186. The remaining input of the adder 186 is connected to the register 188 that holds the value of the P_bound defined earlier in this document. Register 188 is written during the system power-up, and can be optionally implemented as writable by the system software. The value from the register 188 is subtracted from the values at the other inputs to adder 186 (that is it changes the sign before being added to the rest of the operands). The sign of the output of the adder 186 is forwarded to a sign detector 190. The output 192 of the sign detector indicates whether a sufficient number of resources are eligible for gating-off. For example, the output 192 can be used to determine if sufficient numbers of resources are eligible for gating-off at the step 86 (110) shown in FIGS. 3, 4 and 6.

The logical view of the adders 186, 194, 196 and 184 and the sign detector 190 are shown in a simplified form for the clarity. These adders 186, 194, 196 and 184 and the sign detection 190 can be implemented as a unified multi-input carry save adder.

The selection of resources for deactivation can be supported by hardware structures similar to those shown in FIG. 8, using the additional steps that were described above in context of the exclusive resource identifier table 114 in FIG. 8.

Figure 10:
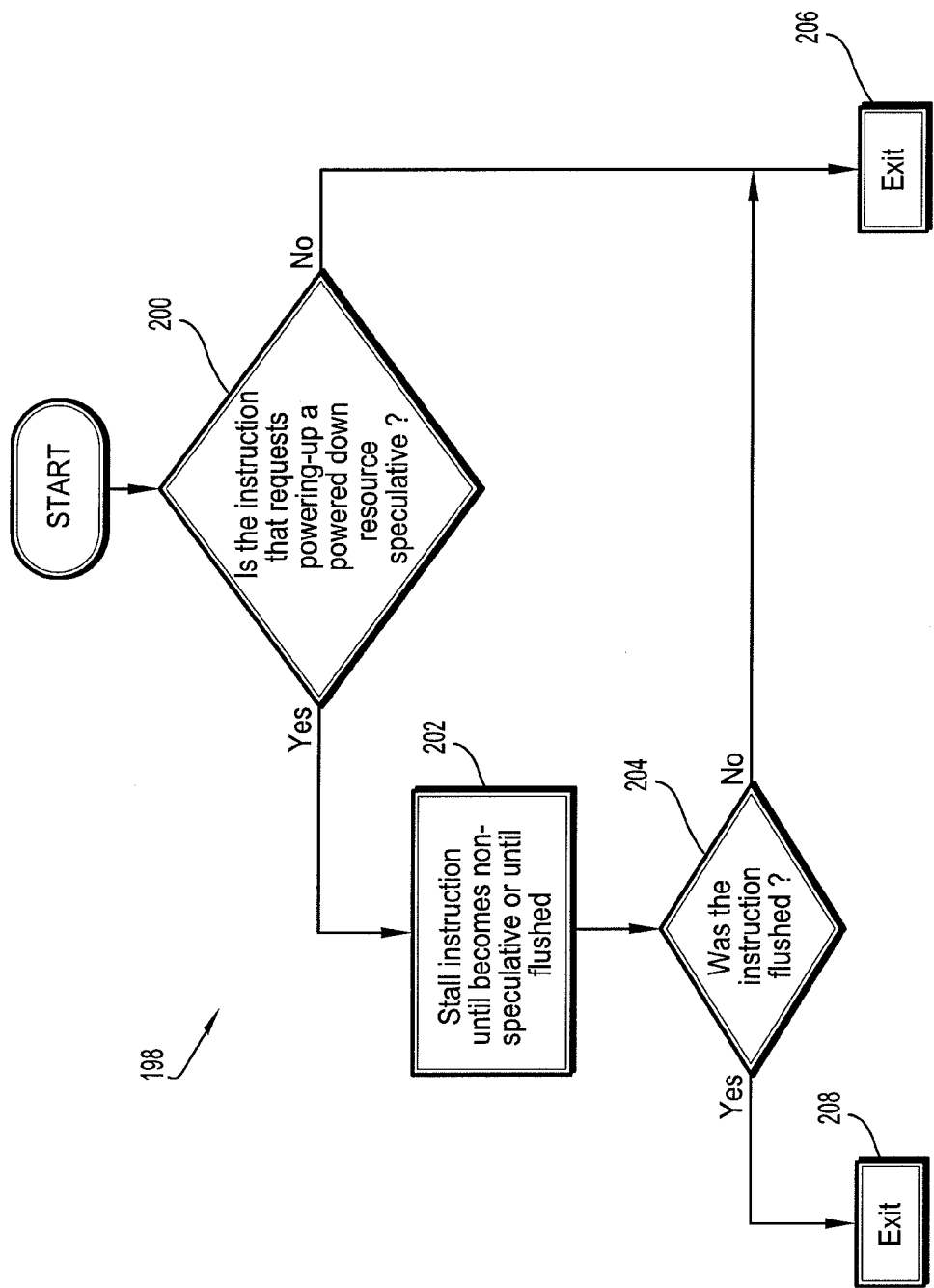
FIG. 10 is a flow diagram that illustrates checking the status of speculative instructions in an exemplary embodiment of the invention.

FIG. 10 is a flow-diagram for checking the status of speculative instructions in an exemplary embodiment of the invention. A sequence of steps in the control flow as used by the MERA control unit 12 is shown in a flow-diagram 198. The sequence of steps in the flow-diagram 198 improves the efficiency of instruction execution in microprocessors with speculative issue. The sequence of control steps shown is entered after an instruction is detected that requests access to a resource that is gated off. For example, the control flow to the sequence of steps shown may come from step 82 as shown in FIG. 3-7.

Step 200 is the first step of the control sequence where the status of the instruction that requests access to the gated resource is checked. If the instruction is non-speculative (i.e., all the branches that precede the instruction have been resolved), then the control exits at an exit point 206, and proceeds with the checking of whether the control needs to go to the program phase change loop or the irregular behavior loop (for example, see FIGS. 3-7).

If at the step 200 the instruction is determined to be speculative (i.e., there is at least one branch that precedes the instruction that has not been resolved), then the control goes to step 202. At this step the issuing process of the instruction is stalled until all preceding branches have been resolved. At the exit from step 202 the status of the instruction is either changed to non-speculative, or the instruction is flushed from the pipeline.

At step 204 the status of the instruction is checked. If it has become non-speculative, the control exits this optional sequence of steps, and proceeds with checking whether the control needs to go to the program phase change loop or the irregular behavior loop (e.g., See FIG. 3-7). If the instruction is flushed, then the control exits this optional sequence of steps at an exit point 208, and proceeds with the steps 80 or 84 as shown in FIGS. 3-7, or else to the step 82 as shown in FIGS. 6-7 through an exit point 206.

Figure 11:
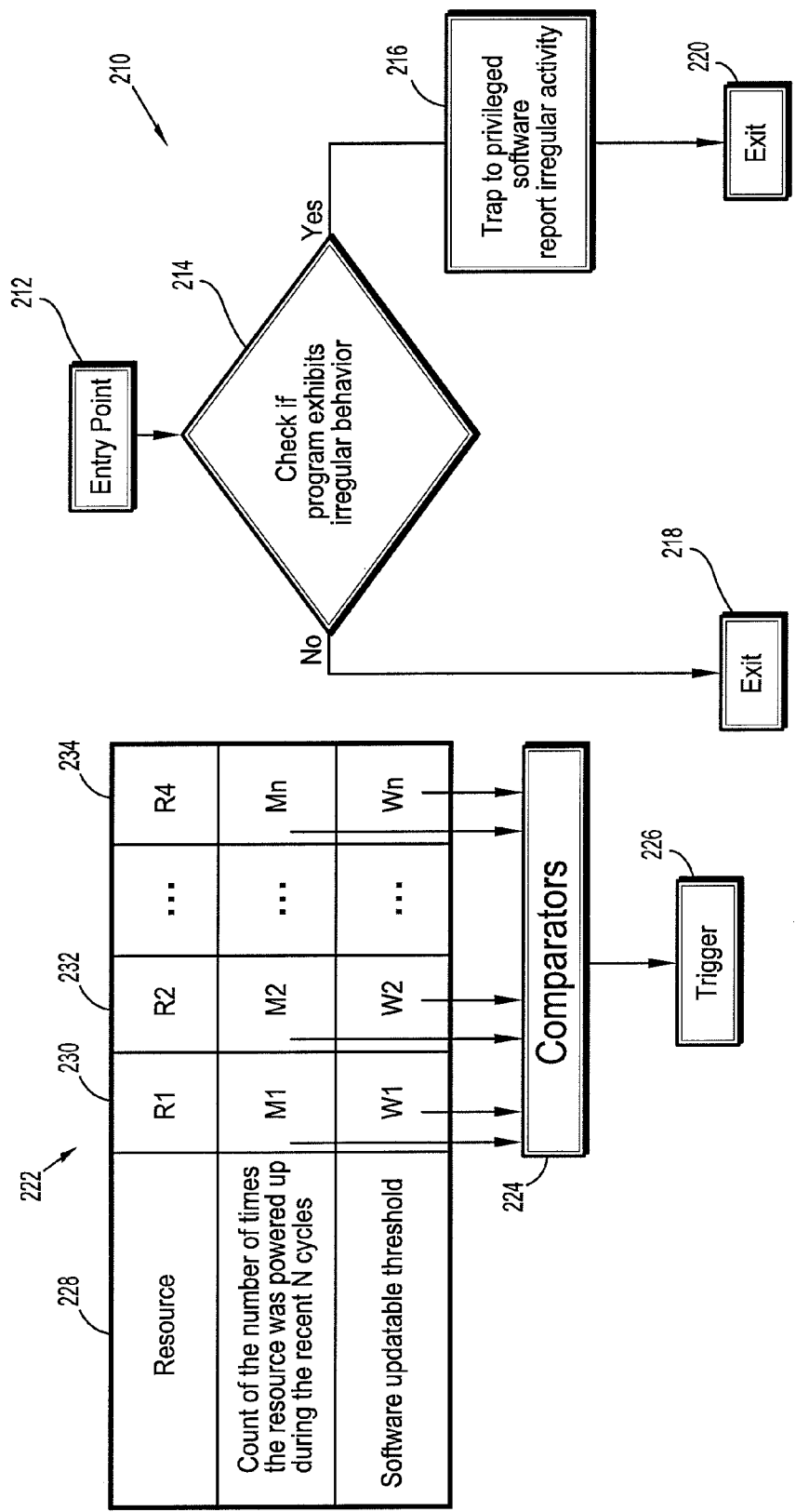
FIG. 11 is a flow diagram that illustrates checking for irregular behavior of program instructions being executed by a MERA control unit in an exemplary embodiment of the invention.

FIG. 11 is a flow diagram that illustrates checking for irregular behavior of the program thread being executed by the processor in an exemplary embodiment of the invention. There are several points in the control flow at which sequence of steps shown in a flow-diagram 210 can be inserted. The sequence of control steps shown can be entered after one of the following conditions is detected in the control flow of the embodiments in FIGS. 3-7:

a) An instruction was detected that requests access to a resource that is gated off (e.g., the "yes" branch from the step 82 as shown in FIGS. 3-7), or b) There are no sufficient resources available for deactivation (e.g., the "no" branch from the step 86 of the embodiments in FIGS. 3 and 4, or c) Resource designated as mutually exclusive is in use (e.g., the "yes" branch from step 86 as shown in FIG. 5), or not gated off (e.g., the "no" branch from the step 112 as shown in FIG. 7), or d) The requested resource cannot be activated without exceeding the set power limit (e.g., the "no" branch from the step 110 of the embodiment in FIG. 6)

To implement a step 214, the hardware may implement a resource activation history counter 222, either for each individual resource, or for groups of resources. These are aging counters that are incremented whenever the corresponding resources are activated. Also, for every resource or a group of resources, the hardware stores the value of the threshold which can be updated by software. A set of comparators 224 compare the counters in row 230 with the corresponding threshold values in row 232. If any of the counters exceed the corresponding threshold value, then the trigger signal 226 at the outputs of the counters is asserted.

At a step 214, if the trigger is set (i.e., the resource activation history indicates that the switching of resources between active and gated modes happens more often than a predefined resource activation frequency threshold), the control goes to step 216. Otherwise the control exits the sequence of steps at an exit point 218, and returns to the appropriate points of control, e.g., either at step 86 of the embodiments in FIGS. 3-7, or at step 90 as shown in FIGS. 3-4, and at step 94 as shown in FIGS. 5 and 7.

At a step 216 a trap to the system software is initiated (e.g., by asserting appropriate control on signal 50 in FIG. 1 that goes to an input of the interrupt/trap control block 34). The trap indicates to the system software (e.g., the thread scheduler) that the currently running combination of threads results in an inefficient execution, or that the current thread exhibits an irregular behavior and should be switched to a lower priority mode, or moved to execute on another core or terminated. During the trap the instruction requesting access to the gated resource can be emulated in software. After the step 216, the execution of the application code is resumed from an exit point 220.

Figure 12:
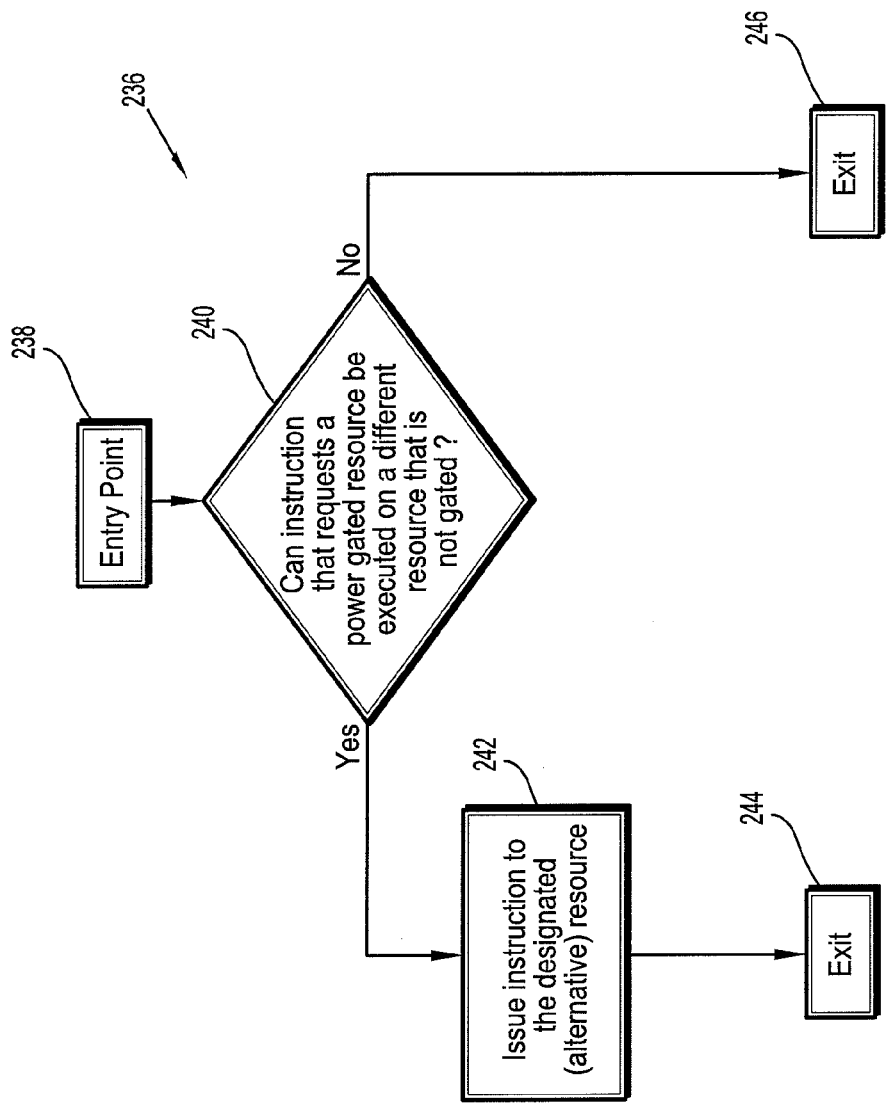
FIG. 12 is a flow diagram that illustrates issuing of an instruction to an alternative resource for execution to avoid the activation of the requested gated resource.

FIG. 12 is a flow diagram that illustrates issuing of an instruction to an alternative resource for execution to avoid the activation of a gated resource. There are several points in the control flow at which this sequence of steps in flow-diagram 236 can be inserted. The sequence of control steps in the flow-diagram 236 can be entered after one of the following conditions is detected in the control flow of the embodiments in FIGS. 3-7 as below:

a) There are no sufficient resources available for deactivation (e.g., the "no" branch from a step 86 as shown in FIGS. 3 and 4), or b) Resource designated as mutually exclusive is in use (e.g., the "yes" branch from step 86 as shown in FIG. 5), or not gated off (e.g., the "no" branch from the step 112 as shown in FIG. 7), or c) The requested resource cannot be activated without exceeding the set power limit (e.g., the "no" branch from step 110 as shown in FIG. 6).

At step 240, the MERA control unit 12 checks whether the instruction that requested a gated resource can be issued for execution to an alternative resource. Execution in an alternative resource may require a multiple issue of the instruction (i.e., sending the instruction to the same unit in multiple cycles), or replacing the instruction with a sequence of other instructions such that they do not need the activation of any gated resources). The substitution of the instruction with a sequence of other instruction can be performed by the microcode engine (e.g., microcode engine 24 in FIG. 1). Examples of such instruction substitution include the execution of a multiply instruction using a sequence of add instructions; execution of 64-bit multiply instructions using a sequence of 32-bit multiply; shift and add instructions; and execution of a SIMD (Single Instruction Multiple Data) instructions using a sequence of scalar instructions. Another example is the execution of a group of two floating point instructions that require two floating point units (if issued in parallel) on a single floating point unit, which is performed by issuing the two floating point scalar instructions sequentially.

If the instruction cannot be issued to an alternative resource, the control exits the sequence of steps in the flow-diagram 236 at an exit point 246, and returns to the appropriate points of control of the various embodiments, for example, either to the step 90 of the embodiments in FIGS. 3-4 and 6 or the step 94 as shown in FIGS. 5 and 7).

As a result of check at step 240 if it is determined that the instruction can be issued to an alternative resource, the control goes to a step 242. At the step 242 the instruction is either replaced with a sequence of instructions issued to an alternative resource, possibly sequentially, and the control is returned either to step 80 or step 84 as shown in FIGS. 3-7, or goes to step 106 as shown in FIGS. 6-7.

Insertion of stall cycles is described next. The MERA control 12 (See FIG. 1) unit may enforce a number of stall cycles at different steps of the control flow as described above and shown in FIGS. 3-7. For example, a number of stall cycles may be enforced after the step 96 as shown in FIGS. 3-7 to allow the resources that were signaled to be activated in step 96 to complete the activation procedure. This step ensures that the requested resource is fully activated before any instruction is issued to it. Also, additional stall cycles between the steps 92 and 96 as shown in FIGS. 3-5 may be enforced to prevent the temporary power increase caused by the activation procedure in the resources being activated.

Although exemplary embodiments have been described herein with reference to the accompanying drawings, it is to be understood that the invention is not limited to the exemplary embodiments described herein, and that various other changes and modifications may be affected therein by one skilled in the art without departing form the scope or spirit of the invention. All such changes and modifications are intended to be included within the scope of the invention as defined by the appended claims.

We claim:

1. A method for controlling power parameters in a microprocessor, comprising:

receiving for execution by the microprocessor an instruction of a predetermined segment of code;

determining the instruction to be of the predetermined segment of code;

controlling a plurality of resources of the microprocessor, wherein controlling comprises activating a first resource, of the plurality of resources, requested for an execution of the instruction and gating a second resource, of the plurality of resources, that is not requested for the execution of the instruction; and maintaining a total power consumed and dissipated by an execution of the segment of code by the plurality of resources to be within a power bound, wherein the power bound is predetermined for the predetermined segment of code.

2. The method of claim 1, wherein the step of gating comprises performing power-gating, clock gating, data gating, combined power-and-clock gating, combined power-and-data gating, or combined clock and data gating of the second resource prior to activating the first resource, wherein the first resource is requested by the instruction.

3. The method of claim 2, wherein the step of power-gating comprises:

stalling the issue of a microprocessor instruction until the second resource is ready to be deactivated; and deactivating the second resource prior to activating the first resource requested by the instruction.

4. The method of claim 1, wherein the step of gating comprises triggering a phase change loop to select for gating off the second resource which is not used prior to activating the first resource that is gated upon an occurrence of a condition that requires usage of a power gated resource in the first resource.

5. The method of claim 1, wherein the step of gating comprises triggering an irregular behavior loop that initiates the process of deactivating the second resource upon an occurrence of a condition that requires deactivation of a currently active resource prior to activation of the first resource.

6. The method of claim 1, wherein the step of gating comprises stalling a speculative instruction which requests access to the first resource that is deactivated to stall until the speculative instruction becomes non-speculative or is invalidated through an instruction invalidation mechanism.

7. The method of claim 1, further comprising determining the second resource for deactivation by reading one or more entries for the second resource from a resource table indexed by the elements of the first resource.

8. A method for controlling power parameters in a microprocessor, comprising:

controlling the activation of two or more resources of the microprocessor;

maintaining the total power consumed and dissipated by the resources that are activated to be below a power bound that is configurable to a predetermined value below a maximum power of the microprocessor;

activating a first selection which comprises one or more of the resources requested to be activated by a microprocessor instruction; and gating a second selection which comprises one or more of the resources other than the resources in the first selection, wherein the step of gating comprises stalling a speculative instruction until the speculative instruction becomes non-speculative or is invalidated through an instruction invalidation mechanism.

9. A method for controlling power parameters in a microprocessor, comprising:

controlling the activation of two or more resources of the microprocessor;

maintaining the total power consumed and dissipated by the resources that are activated to be below a power bound that is configurable to a predetermined value below a maximum power of the microprocessor;

activating a first selection which comprises one or more of the resources requested to be activated by a microprocessor instruction;

determining resources forming a second selection, which comprises one or more of the resources other than the resources in the first selection, for deactivation by reading one or more entries for the second selection from a resource table indexed by the elements of the first selection; and gating the second selection.

* * * * *